Jan. 10, 1939.  P. BOURQUE  2,143,619
ELECTRODE HOLDER
Filed Nov. 10, 1937
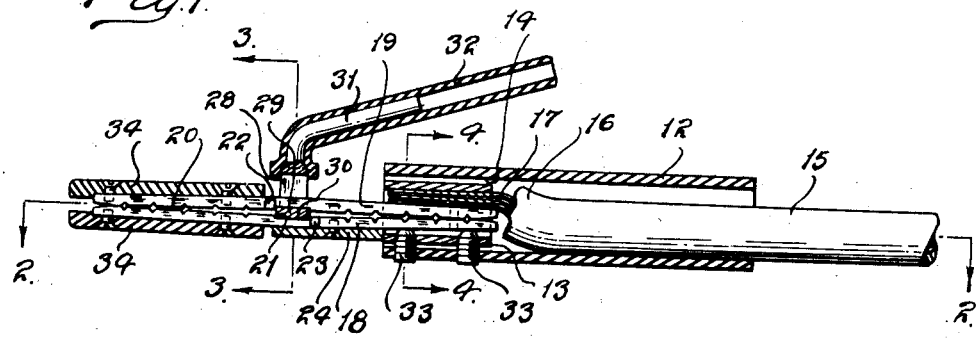
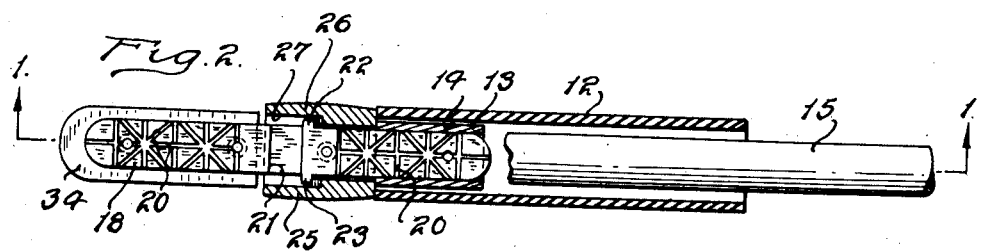
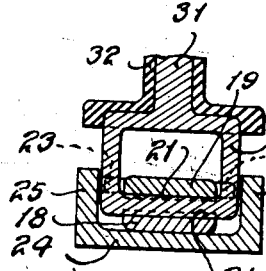
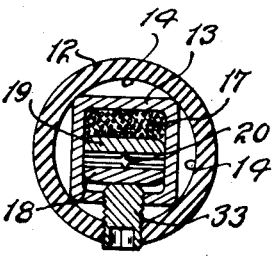
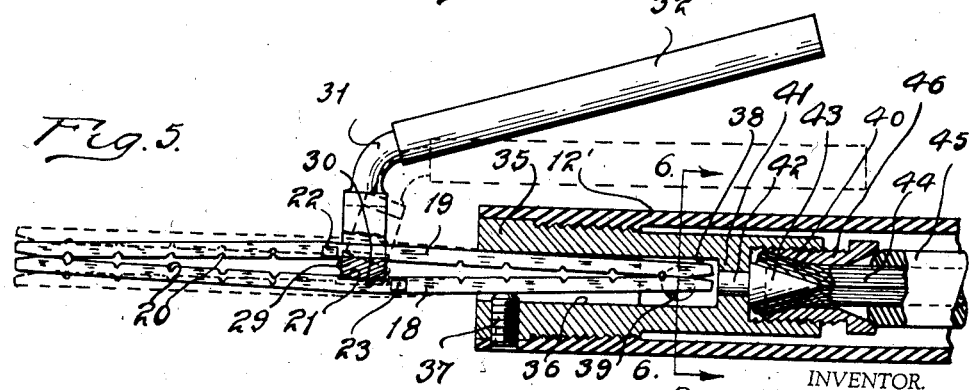
INVENTOR.
PHILIP BOURQUE.
BY Thos. Donnelly
ATTORNEY.

Patented Jan. 10, 1939

2,143,619

UNITED STATES PATENT OFFICE 2,143,619

ELECTRODE HOLDER

Philip Bourque, Detroit, Mich.

Application November 10, 1937, Serial No. 173,747

8 Claims. (Cl. 219—8)

My invention relates to a new and useful improvement in an electrode holder adapted for use in welding operations and has for its object the provision of an electrode holder which will be simple in structure, economical of manufacture, durable, easily operated and highly efficient in use.

Another object of the invention is the provision of an electrode holder so constructed and arranged that the electric cable may be easily attached thereto and detached therefrom.

Another object of the invention is the provision of an electrode holder having a pair of removable jaws which may be easily and quickly placed in the handle and removed therefrom.

Another object of the invention is the provision of an electrode holder having a pair of separate jaws which may be inserted at one end into a holder and securely bound in position and constructed similarly at both ends so that after one of the ends of the jaws has been used as the wire gripping portion and burnt off so that it is no longer adapted for gripping purposes, the jaws may be reversed as to position relatively to the handle and the previously inserted ends used as the gripping ends.

Another object of the invention is the provision of an electrode holder whereby the handle may be maintained in comparatively cool condition at all times.

Other objects of the invention will appear hereinafter.

The invention consists in the combination and arrangement of parts hereinafter described and claimed.

The invention will be best understood by a reference to the accompanying drawing which forms a part of this specification, and in which, Fig. 1 is a longitudinal, central, vertical, sectional view of the invention.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a fragmentary, longitudinal, central, vertical, sectional view of a modified form of the invention.

Fig. 6 is a sectional view taken on line 6—6 of Fig. 5.

In the invention I provide a tubular handle 12 formed from suitable insulating material such as fiber or the like. Positioned in one end of this handle 12 by a press fit is a metallic retainer 13 which I have illustrated as square in cross section. It is not necessary that this member be square in cross section but it is desirable that it be provided with flat faces and tubular so that it may be a poly-lateral construction having flat faces and corners, the corner edges engaging against the inner surface of the handle 12 to provide the channels 14. Inserted into the rear end of the handle is the cable 15 from the forward end of which the insulation 16 is removed to expose the wire 17 which extends into the retainer 13.

In use the forward end of the structure will become heated and thus currents of air would be drawn through the handle entering at the rear end and passing through the channels 14 so as to assist in retaining the device in cooled condition.

As clamping jaws I provide a pair of elongated plates 18 and 19 forming the lower and upper jaws, respectively. Each of these plates is a duplicate of the other and has on its inner face a plurality of grooves 20 to assist in retaining the electrode wire when clamped therebetween. Formed in the inner face of each of these plates 18 and 19, centrally thereof, is a transversely extended recess 21 and projecting outwardly from one side of this recess 21 are lugs 22 and 23. Secured to the lower plate 18 is a channel-shaped guide 24 having the upwardly projecting side walls 25 and 26 which embrace the plate 18 so that the plate 18 lies in the channel of this guide member. The side walls of this guide member, at their forward ends, are cut away on their inner faces as at 27 and the tongues 22 and 23 are positioned in the rearward end of this cut away portion. The transversely extending recess 21 lies between the side walls 25 and 26 and the rear end of the guide strip abuts against the forward end of the handle 12. When the jaws are mounted in cooperative position with their grooved faces opposed, the transversely extending recesses 21 on the jaws will overlie each other, the lugs 22 and 23 on one of the jaws being positioned at one side of the recess on the one jaw and the lugs 22 and 23 on the other jaw being positioned at one side of the recess of the opposed jaw or plate.

I provide an operating device embodying a stirrup or closed loop 28 through which the upper jaw or plate 19 is projected, the lugs 22 and 23 on this upper plate or jaw 19 abutting against the stirrup 28 and limiting inward thrust thereof. The construction is such that when the plates or jaws 18 and 19 are positioned with their ends in alignment, the lower portion or cross bar 29 of the stirrup, which is provided with the curvilinear undersurface 30, will lie between the location of the lugs of these separate plates and maintain alignment of the recesses 21 formed in these plates. An angularly turned, rearwardly projecting stem 31 extends outwardly from the stirrup 29 and is provided with a covering 32 of insulating material which forms an extension thereof.

When the jaws are positioned in opposed relation with their ends in alignment, and the actuating handle in position, they are inserted into the retainer 13 with the bared wire 17 positioned between the jaws and the inner face of one of the sides of the retainer 13. Set screws 33 threaded into the retainer 13 are then threaded inwardly to press the jaws toward the wire 17 and securely clamp the same against the inner surface of one of the faces of the retainer 13.

By rocking the stirrup or actuating handle, the forward ends of the jaws may be sprung apart against the resiliency of the material from which these jaws are made so that an electrode wire may be inserted between the jaws. When this spreading pressure is released, the jaws will clamp the wire between them and securely hold it in position.

A layer 34 of insulating material is secured to the forward ends of these jaws or plates 18 and 19 and, as shown in Fig. 2, projects outwardly beyond the edges of these jaws thus forming not only an insulation but a shield as well.

With an electrode holder constructed as described, the handle is maintained in a comparatively cool condition. The jaws may be easily and quickly sprung apart so that the electrode may be moved relatively to the jaws. The cable may be easily and quickly detached while at the same time when in use, it is held securely in position and a very efficient contact between the cable and the jaws is maintained. It will be noted that the use of soldering is dispensed with and while soldering may be used in addition to the method of connection shown, experience has shown that it is not necessary to solder the connection in order to obtain an efficient operation.

Should the forward ends of the jaws become worn or burned so that they are no longer effective as a clamping element, the layers of insulation 34 may be removed and the jaws reversed in their position relatively to the handle, the outer ends thereof being extended into the retainer 13 and the inner ends used for clamping purposes. The layers 34 of insulation may then be replaced on the reverse ends of the jaws. In this way I have provided an economical structure in which the reversing of the clamping jaws will render additional life to the structure.

In Fig. 5 and Fig. 6 I have shown a slightly modified form of construction in which a different type of connection is utilized for connecting the cable to the jaws. In this form I have used the same type of jaws and actuating handle illustrated in Fig. 1 but in the tubular handle 12' of insulating material, I thread a retainer 35 which is formed from metal and provided with the inwardly projecting socket 36 into which the ends of the jaws or plates 18 and 19 may be inserted. A set screw 37 serves to clamp these jaws in position. The inner end of the socket 36 opens laterally through the openings 38 and communicates with the openings 39 formed in the handle 12' so that air may be permitted to pass through the socket 36 and serve as a cooling agent therefor. The inner end of the retainer is provided with a threaded socket 40 separated from the socket 36 by the partition 41. Pressed into the partition 41 is a stem 42 having a conical head 43 which projects into the threaded socket 40. The wire 44 from which the insulating material 45 has been removed, is projected through a fitting 46 which is adapted to thread into the socket 40. As this fitting 46 is threaded into the socket it will carry with it the wire 44 and force it against the conical member 43 and effect a spreading and a clamping of the wire so that a firm and highly efficient electrical connection is made between the cable and the retainer 35. The advantages relating to the reversal of the jaws and the simplicity of actuation in spreading the jaws found in the form shown in Fig. 1, are also present in the form shown in Fig. 5 and Fig. 6.

While I have illustrated and described the preferred form of construction I do not wish to limit myself to the precise details of structure shown but desire to avail myself of such variations and modifications as may come within the scope of the appended claims.

What I claim as new is:

1. In an electrode holder of the class described, a tubular handle formed from insulating material; a hollow flat faced retainer inserted in one end of said handle and engaging at its edges the inner surface thereof, there being a space between the inner surface of said handle and the faces of said retainer, said retainer being adapted for reception of one end of a cable; a pair of clamping jaws positioned in opposed registering relation and inserted at one end into said retainer; and means for clamping said cable between one side of said retainer and said jaws and securing said ends of said jaws in said retainer.

2. In an electrode holder of the class described, a tubular retainer; a pair of clamping jaws, each of said jaws comprising an elongated plate; a tongue projecting outwardly from opposite edges of each of said plates intermediate one end and the medial transverse line thereof, said plates being adapted for positioning in engagement in registration with each other, said plates, when so positioned in engagement with each other, being reversed relatively as to their ends for effecting longitudinal spacing of the pair of tongues on one plate relatively to the pair of tongues on the other plate, said plates upon such arrangement in engagement with each other, being insertable at either of their ends into said retainer; and means for securing the inserted ends of said plates in said retainer.

3. An electrode holder of the class described, comprising: a tubular handle formed from insulating material; a retainer mounted in one end of said handle and adapted for the reception of one end of a cable; a pair of jaw forming plates arranged in registering engaging relation with each other, either end of said plates being insertible into said retainer; and means for clamping said plates and said cable against one side of said retainer.

4. An electrode holder of the class described, comprising: a hollow handle formed from insulating material; a retainer mounted in one end of said handle; a pair of jaw forming plates arranged in superimposed registering relation and insertible at either of their ends into said retainer; a guide strip mounted on one of said jaws adjacent its inserted end abutting against said handle and projecting outwardly therefrom, said guide strip being channel shaped in cross section; and means projecting into the channel of said guide strip and engageable with said jaw forming plates for spreading apart the outer ends thereof.

5. An electrode holder of the class described, comprising: a tubular handle formed from insulating material and circular in cross section; a poly-lateral tubular retainer inserted into one end of said handle, the meeting edges of the faces of said retainer engaging the inner surface of said handle to provide air passages for the circulation of air in proximity to said retainer; a pair of jaw-forming plates arranged in superimposed registering relation and insertible at one of their ends into said retainer; a cable insertible at one end into said retainer; and means for securing said cable and said jaws in fixed relation to, in contact with, said retainer.

6. An electrode holder of the class described, comprising: a handle having a tubular portion; a retainer mounted on one end of said handle and adapted for reception of one end of a cable; a pair of jaw-forming plates arranged in registering, engaging relation with each other, either end of said plates being insertible into the hollow portion of said handle and contacting with said retainer; and means for securing said jaws in contacting relation with said retainer.

7. In an electrode holder of the class described, a handle having a tubular portion; a hollow retainer inserted in said tubular portion, said retainer being adapted for the reception of one end of a cable; a pair of clamping jaws positioned in opposed registering relation and inserted at one end into said retainer; and means for clamping said cable between one side of said retainer and said jaws and securing said end of said jaws in said retainer.

8. In an electrode holder of the class described, a handle having a tubular portion; a hollow retainer inserted in said tubular portion, said retainer being adapted for the reception of one end of a cable; a pair of clamping jaws positioned in opposed registering relation and inserted at one end into said retainer; and threaded means for threading inwardly of said retainer and effecting a clamping relation between one side of said retainer, said jaws and said cable and securing said ends of said jaws in said retainer.

PHILIP BOURQUE.